United States Patent [19]

Takahama

[11] 4,241,995
[45] Dec. 30, 1980

[54] APPARATUS FOR MEASURING AMOUNT OF DISPLACEMENT

[75] Inventor: Akio Takahama, Kawasaki, Japan

[73] Assignee: Nippon Kogaku K.K., Tokyo, Japan

[21] Appl. No.: 972,079

[22] Filed: Dec. 22, 1978

[30] Foreign Application Priority Data

Dec. 28, 1977 [JP] Japan .............................. 52/159450

[51] Int. Cl.$^3$ .................. G01C 3/08; H01G 5/00; H03H 7/20; H01G 5/16
[52] U.S. Cl. ...................................... 356/5; 324/83 R; 324/83 D; 333/139; 333/140; 333/144; 343/12 R; 361/278; 361/280
[58] Field of Search .................. 324/83 R, 83 D, 188, 324/190; 333/139, 140, 144; 356/5; 343/14, 12 R, 12 A; 361/278, 280, 284

[56] References Cited

U.S. PATENT DOCUMENTS

| | | | |
|---|---|---|---|
| 2,025,719 | 12/1935 | Blau et al. | 361/280 |
| 2,417,033 | 3/1947 | Wolff et al. | 343/12 A |
| 2,427,348 | 9/1947 | Bond et al. | 333/144 |
| 2,825,978 | 3/1958 | Davis | 361/280 |
| 2,966,824 | 1/1961 | Granqvist | 356/5 |
| 3,543,150 | 11/1970 | Brandenburg | 324/83 D |
| 3,619,058 | 11/1971 | Hewlett et al. | 356/5 |
| 3,900,260 | 8/1975 | Wendt | 356/5 |
| 4,112,365 | 9/1978 | Larson et al. | 324/83 R |

Primary Examiner—Stephen C. Buczinski
Attorney, Agent, or Firm—Fitzpatrick, Cella, Harper & Scinto

[57] ABSTRACT

An apparatus for measuring the amount of relative displacement of mutually facing electrodes in such a direction as to cause a change in the distance therebetween, comprises:

a power source generating an AC signal of a determined frequency;

a phase-shifting means comprising a resistor and the mutually facing electrodes, the phase-shifting means being adapted to apply the AC signal to the mutually facing electrodes through the resistor and to generate an output signal of which the phase is shifted in response to the amount of relative displacement of the mutually facing electrodes; and a phase difference measuring means for measuring phase difference between the output signal of the phase-shifting means and the AC signal and generating a signal corresponding to the amount of relative displacement of the mutually facing electrodes.

7 Claims, 7 Drawing Figures

APPARATUS FOR MEASURING AMOUNT OF DISPLACEMENT

BACKGROUND OF THE INVENTION

1. Field of the Invention

The present invention relates to apparatus for measuring the amount of displacement between two elements, and more particularly, to apparatus for measuring the amount of relative displacement of mutually facing electrodes in such a direction as to cause a change in the distance therebetween.

2. Description of the Prior Art

As a displacement measuring apparatus there is already known a tilt meter apparatus for measuring the inclination of a movable electrode with respect to a fixed electrode utilizing the dependence of electrostatic capacity between the electrodes on the distance therebetween. In such known apparatus the electrostatic capacity between the fixed and movable electrodes is utilized as a capacity for determining the oscillating frequency of an oscillator, and the mutual displacement of the electrodes is thus converted into a change in the oscillation frequency to achieve the measurement.

The use of such apparatus has, however, led to difficulties in conducting measurement with sufficient accuracy, as it is easily subjected to external perturbations such as:

(1) fluctuation in oscillation frequency resulting from temperature-dependent changes in characteristic constants of elements such as a transistor constituting the oscillator; and (2) noise effect on the measurement which is unavoidable since the use of a narrow-band filter is rendered impossible by the use of frequency change as a parameter representing the change in the distance between the electrodes.

SUMMARY OF THE INVENTION

I have conceived and contribute, by the present invention, a displacement measuring apparatus for measuring the amount of mutual displacement of electrodes in such a direction as to cause a change in the distance therebetween, which apparatus is less influenced by external perturbations such as temperature changes or noise, thus providing an improved accuracy in measurement.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1A:
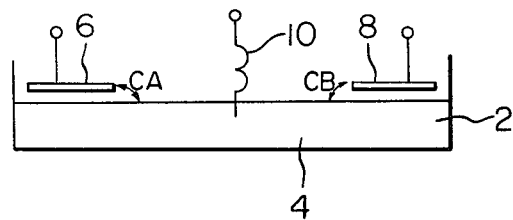
FIGS. 1A and 1B show a first embodiment of the present invention.
Figure 1B:
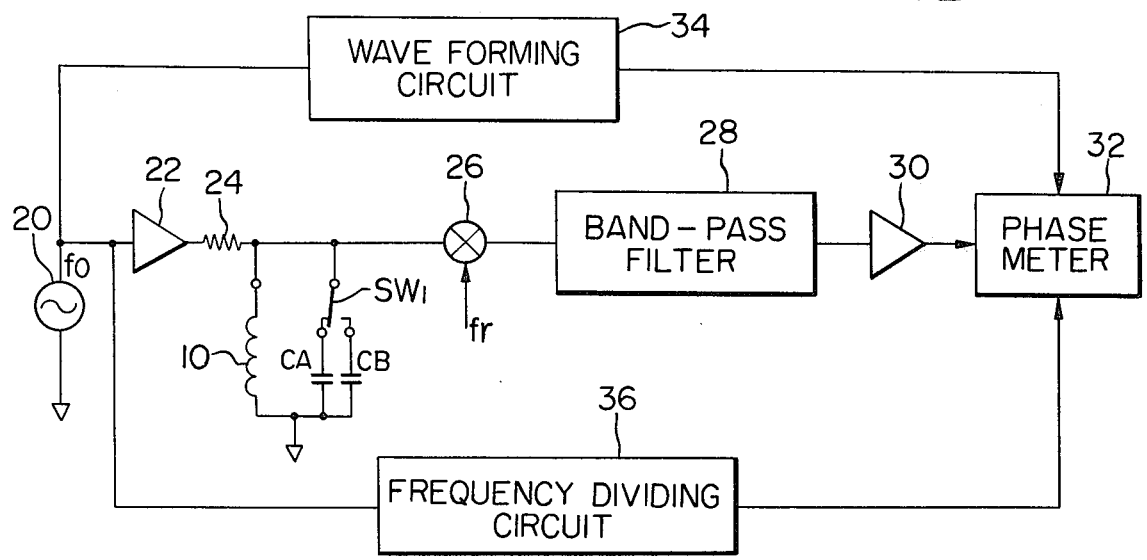

Reference is now made to FIGS. 1A and 1B showing a first embodiment of the present invention. In FIG. 1A I illustrate the structure of mutually facing electrodes, a container 2 containing a quantity of mercury 4, the surface of which is parallel to electrodes 6, 8 and in which an end of a coil 10 is immersed, whereby the mercury 4 and electrodes 6, 8 respectively constitute a movable electrode and fixed electrodes. The electrodes 6, 8 are fixed integrally to the container 2 so that, if the container 2 is mounted on an unrepresented surveying instrument, for example, the distance between the electrodes 6, 8 and the surface of mercury 4 changes according to the inclination of the instrument. It is therefore possible to determine the inclination of the surface of mercury 4 with respect to the instrument by measuring the electrostatic capacity $C_A$ or $C_B$ between the electrode 6 or 8 and the mercury 4. FIG. 1B shows a circuit for measuring the electrostatic capacity $C_A$ or $C_B$, wherein a capacity selecting switch SW1 connects either the capacity $C_A$ or $C_B$ parallel to the coil 10 to form a parallel resonance circuit, to which there is applied a sinusoidal voltage of a frequency $f_O$ from an oscillator 20 through a buffer amplifier 22 and a resistor 24. The voltage appearing across the coil 10 is supplied to a mixer 26 and is subjected to a frequency conversion therein.

Now, in case the switch SW1 is so positioned as to form the parallel resonance circuit including the coil 10 and the capacity $C_A$, there stands the following equation between the voltage $e_O$ across the coil 10 and the output voltage $e_i$ of the buffer amplifier 22:

$$e_0 = \frac{f \cdot 2\pi f_0 L}{\{1 - (2\pi f_0)^2 L C_A\}R + j \cdot 2\pi f_0 L} e_i \qquad (1)$$

wherein it is supposed that the buffer amplifier 22 has an output impedance equal to zero while the mixer 26 has an infinite input impedance, and L and R respectively represent the inductance of coil 10 and the resistance of resistor 24.

In this case the phase difference between the voltages $e_O$ and $e_i$ can be determined from the equation (1) and can be expressed by the following equation (2):

$$\theta = \tan^{-1} \frac{\{1 - (2\pi f_0)^2 L C_A\}R}{2\pi f_0 L} \qquad (2)$$

Figure 2:
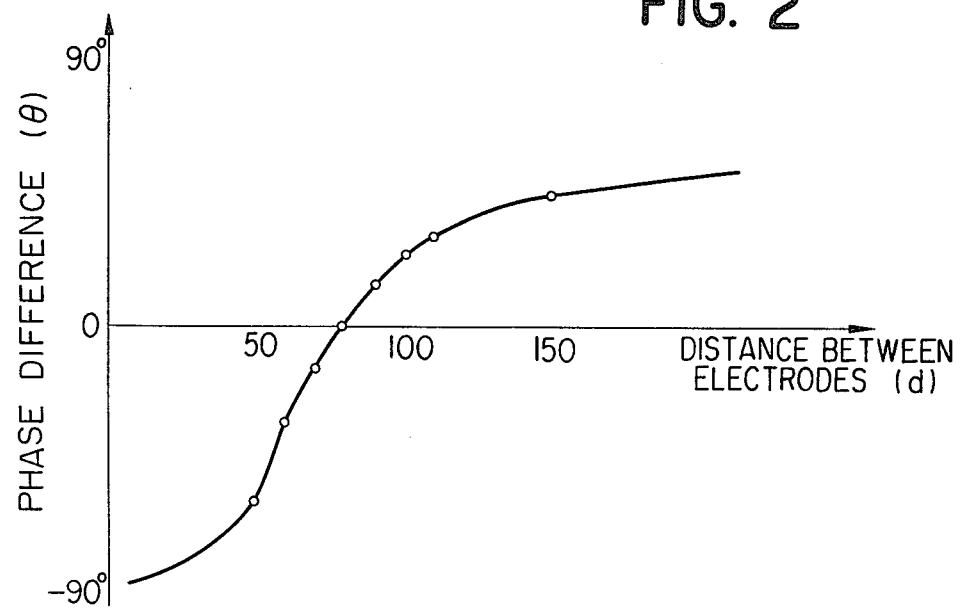
FIG. 2 is a chart showing the phase difference between the output of a buffer amplifier and the voltage across the coil as a function of the distance between the electrode and the surface of mercury.

As can be seen from the foregoing equation (2), the output of buffer amplifier 22 is phase shifted in response to the amount of electrostatic capacity $C_A$ before introduction to the mixer 26. FIG. 2 shows the phase difference $\theta$ between the output $e_i$ of buffer amplifier 22 and the voltage $e_O$ across the coil 10 as a function of distance (d) between the electrode 6 (or 8) and the surface of mercury 4, wherein the area of the electrode is 2 cm$^2$ and the distance (d) and phase difference $\theta$ are respectively represented in $\mu$m and degree.

Figure 3:
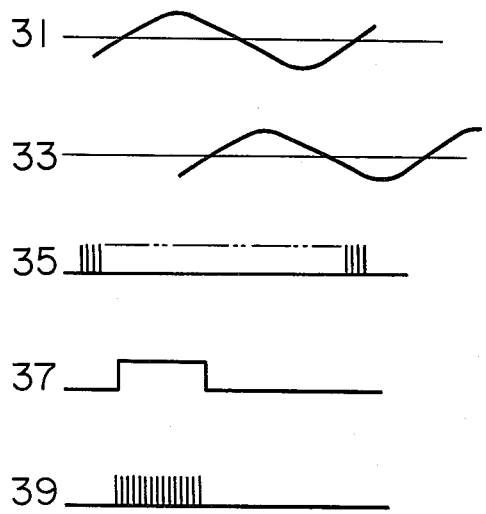
FIG. 3 is a chart showing signals processed in the phase meter.

The voltage $e_O$ across the coil 10 is subjected to a frequency conversion, by mixing with a sinusoidal voltage of a frequency $f_r$ in the mixer 26, into a voltage of a frequency $f_O+f_r$ and a voltage of a frequency $f_O-f_r$, of which the latter alone is supplied as the output from the mixer 26 by means of a band-pass filter 28. The output from the band-pass filter 28 is supplied, after amplification in an amplifier 30, to a phase meter 32, which also receives the output of a wave-forming circuit 34 for generating clock pulses by wave forming on sinusoidal voltage obtained from the oscillator 20, and the output of a frequency dividing circuit 36 for dividing the sinusoidal voltage from the oscillator 20 into a sinusoidal voltage of a frequency $f_O-f_r$. Now the function of said phase meter 32 will be explained in detail while making reference to FIG. 3, wherein the signal 31 is the output of the frequency dividing circuit 36 used as a standard signal, while the signal 33 is the output of amplifier 30 and is subjected to a phase shift. The signal 35 is composed of clock pulses of a frequency $f_O$ supplied from the wave forming circuit 34. The phase meter 32 passes the clock pulses during a period from rising-up of signal 31 to rising-up of signal 33. This is achieved by forming a signal 37 from the signals 31 and 33, and making a logical product of the signal 37 and the signal 35 to obtain the signal 39. The number of pulses contained in the signal 39 is proportional to the phase shift between the signals 31 and 33. For example if the frequency $f_r$ is selected in such a manner that the frequency $f_o-f_r$ is equal to $f_o/10^4$ and the frequency dividing circuit 36 is designed to reduce the output frequency of oscillator 20 to 1/10$^4$ thereof, a measurement of phase difference with a higher precision than in the direct measurement of phase difference between the output of buffer amplifier 22 and the input of mixer 26 is achievable since one cycle of signals 31, 33 is divided into 1/10$^4$ portions.

After the measurement of phase difference corresponding to the electrostatic capacity $C_A$, the switch SW1 is positioned so as to form a parallel resonance circuit with the coil 10 and the capacity $C_B$, and there is conducted, in a similar manner the measurement of phase difference corresponding to the electrostatic capacity $C_B$. The distance between the electrode 6 or 8 and the surface of mercury 4 can then be determined from the difference between the phase differences respectively corresponding to the capacities $C_A$ and $C_B$. Stated differently the capacities $C_A$ and $C_B$ are differentially connected, and the determination of such difference between the phase differences is employed for the following reason. The output from the amplifier 30 obtained when the capacity $C_A$ is connected with the coil 10 to form a parallel resonance circuit includes, as errors, phase delays resulting in the mixer 26, band-pass filter 28, amplifier 30 etc. Thus the phase difference measured by the phase meter 32 can be represented as $\phi_A+\phi_C$ wherein $\phi_A$ is the phase difference corresponding to the capacity $C_A$ while $\phi_C$ is the phase difference resulting from electric circuits. Similarly the phase meter 32 provides an output $\phi_B+\phi_C$ when the capacity $C_B$ is connected to the coil 10 to form the parallel resonance circuit wherein $\phi_B$ is the phase difference corresponding to the capacity $C_B$. It is therefore possible, by determining the difference of outputs of phase meter 32 obtained before and after the changeover of switch SW1, to obtain a value $\phi_A-\phi_B$ not including the phase error $\phi_C$ resulting from the electric circuits themselves. Also when the mercury 4 becomes inclined with respect to the electrodes 6, 8, the distance from the mercury to one electrode increases while that to the other electrode decreases at the same time. Thus the $\phi_A$ and $\phi_B$ included in the difference $\phi_A-\phi_B$ assume opposite signs, thus doubling the sensitivity of measurement and improving the linearity of measurement. Further it is possible to eliminate phase errors resulting from expansion of mercury 4, change in inductance L of coil 10 due for example to temperature change since these factors remain the same before and after the changeover of switch SW1. Furthermore the effect of noise can be minimized by the use of the band-pass filter 28.

Although in the foregoing embodiment the inductance 10 is connected with the capacity $C_A$ or $C_B$ to form a parallel resonance circuit, a similar effect can be achieved by connecting the inductance 10 with the capacity $C_A$ or $C_B$ so as to form a serial resonance circuit. Furthermore, though in the foregoing embodiment, there is employed a resonance circuit for improving the accuracy of measurement, it is also possible to measure the phase change simply resulting from the resistor 24 and capacity $C_A$ or $C_B$. Furthermore in the foregoing embodiment the capacities $C_A$ and $C_B$ are differentially connected to eliminate common errors and to improve the linearity of measurement, but it is also possible, if a high accuracy of measurement is not required, to determine the distance between the electrode 6 or 8 and the surface of mercury 4 directly from the measurement of capacity $C_A$ alone.

Furthermore, when the mercury 4 becomes inclined so that the surface thereof comes in contact with the electrode 6 or 8, the output of amplifiers 30 becomes zero, and therefore it is possible to confirm the effective functioning range from the output of the amplifier 30.

Figure 4:
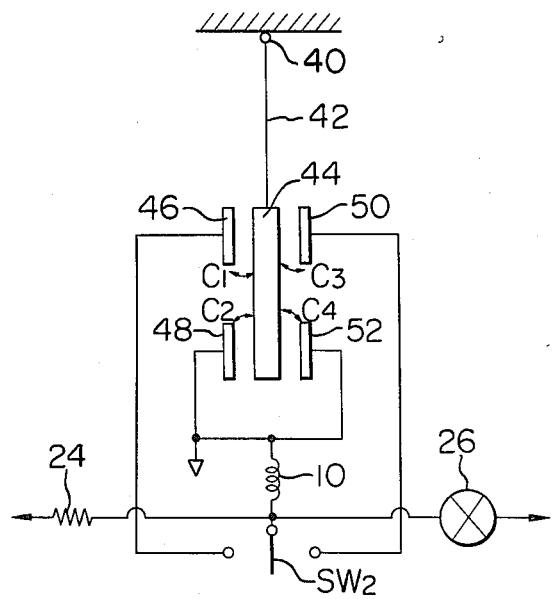
FIG. 4 shows a second embodiment of the movable electrode.

In contrast to the foregoing first embodiment wherein the movable electrode is composed of mercury 4, it is also possible to employ, as the movable electrode, an electrode 44 suspended, as shown in FIG. 4, from a fixed point 40 by a wire 42. In the second embodiment shown in FIG. 4 there are provided two pairs of electrodes 46, 48 and 50, 52 wherein a capacity C1 between the electrodes 44 and 46 serially connected with a capacity C2 between the electrodes 44 and 48 corresponds to the capacity $C_A$ in FIG. 1 while the capacity C3 between the electrodes 44 and 50 serially connected with a capacity C4 between the electrodes 44 and 52 corresponds to the capacity $C_B$ in FIG. 1. This embodiment is usable when the voltage is not applicable directly to the movable electrode 44 and is designed to provide a closed circuit consisting of electrodes 46, 44 and 48 or 50, 44 and 52 wherein the voltage is applied between the electrodes 46 and 48 or 50 and 52. The coil 10 and switch SW2 respectively correspond to the coil 10 and switch SW1 in FIG. 1.

Figure 5:
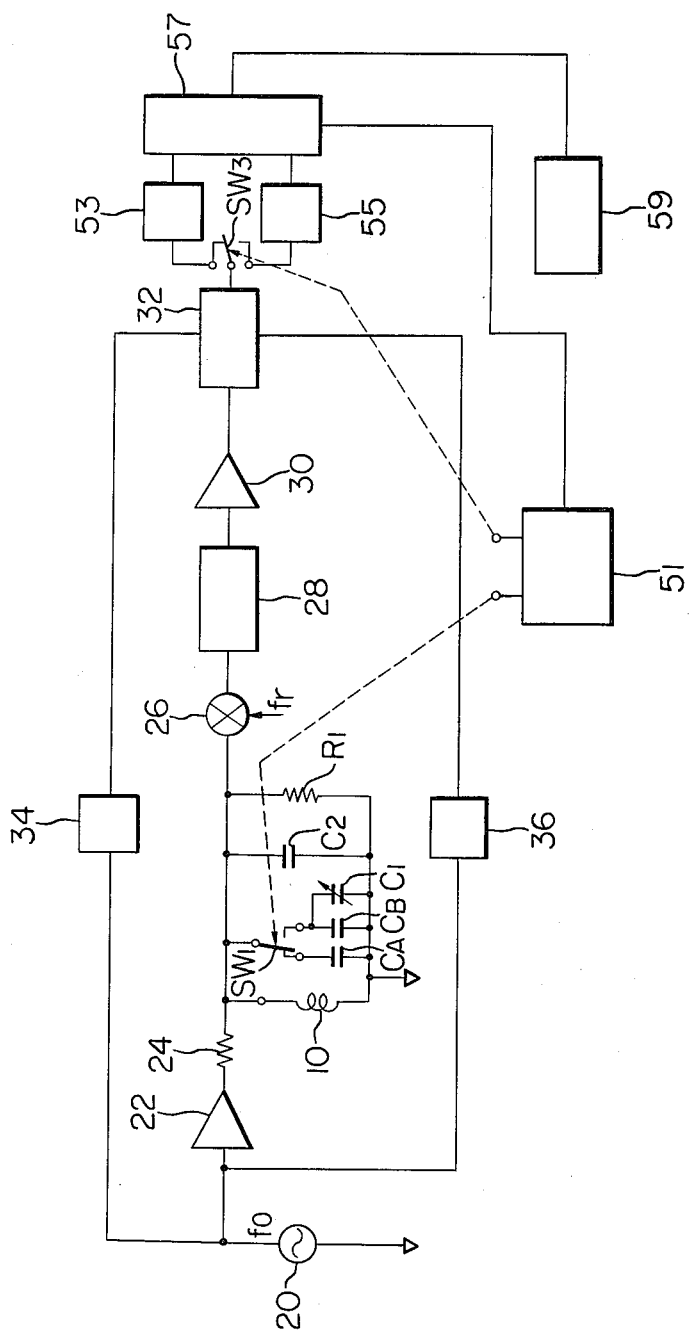
FIG. 5 shows a third embodiment provided with an error compensating circuit.

In the first and second embodiments of the displacement measuring apparatus explained in the foregoing it is difficult to obtain a high sensitivity due to the presence of errors resulting from (1) difficulty in achieving predetermined electrode distances at the assembly of electrodes and (2) stray capacities in the electric circuit unless the adjustment is carefully conducted. In FIG. 5 there is shown a third embodiment capable of providing a high sensitivity without such careful adjustment, this embodiment being further capable of automatically indicating the amount of displacement. In FIG. 5 the components common to those in the first embodiment shown in FIG. 1 are represented by common numbers and are therefore omitted from the following explanation. In this embodiment there is provided a variable capacitor C2 functioning as an auxiliary capacity connected parallel to the coil 10 and forming a synthesized capacity with the electrode capacity $C_A$ or $C_B$ to cause resonance with the inductance of coil 10. It is therefore rendered possible to increase the apparent value of capacity $C_A$ or $C_B$ without increasing the area of electrodes forming the capacitor $C_A$ or $C_B$, to provide a larger flexibility in the preparation of electrodes, and to improve the accuracy of measurement since the measurement in the vicinity of resonance point can be facilitated. Furthermore it is possible to use a coil 10 of a variable inductance instead of using the variable capacitor C2. A resistor $R_1$ is provided parallel to the coil 10 in order to regulate the sensitivity, which becomes lower when the value of resistor $R_1$ is smaller. The sensitivity regulation by the resistor $R_1$ makes it possible to compensate the fluctuation in the sensitivity resulting from eventual change in the mechanical dimensions of electrodes and in the circuit constants. Also parallel to the capacity $C_B$ forming one of the opposed electrodes there is provided a variable capacitor $C_1$ which makes it possible to regulate the balance of the capacities $C_A$ and $C_B$. Where the displacement measuring apparatus of the present invention is used for measuring inclination, it is desirable that the capacities are mutually equal when the apparatus is in horizontal position. In practice, however, the capacities $C_A$ and $C_B$ are generally unbalanced due to the presence of contact capacity in the switch SW1, stray capacities in the electric circuit, etc., and the abovementioned capacity C1 is provided for compensating such unbalance. A control circuit 51 controls the switch SW3 in connection with the position of switch SW1. A first memory circuit 53 memorizes the output of phase meter 32 through said switch SW3, the output corresponding to the capacity $C_A$. Simultaneously with the changeover of switch SW1 to connect the capacity $C_B$ with the coil 10 by a control signal from the control circuit 51, the switch SW3 is actuated to connect the phase meter 32 to a second memory circuit 55, which therefore memorizes an output of the phase meter 32 corresponding to the capacity $C_B$. Thereafter, by an instruction signal from the control circuit 51, a subtraction circuit 57 subtracts the data memorized in the second memory circuit 55 from the data memorized in the first memory circuit 53 and supplies the result of that subtraction to an indicating circuit 59, which converts the result into the amount of displacement and displays the amount. It is therefore possible to have a display of the amount of the latest displacement if the control circuit 51 is designed to alternately generate the switching signal and the instruction signal after a power supply switch (not shown) is closed.

Figure 6:
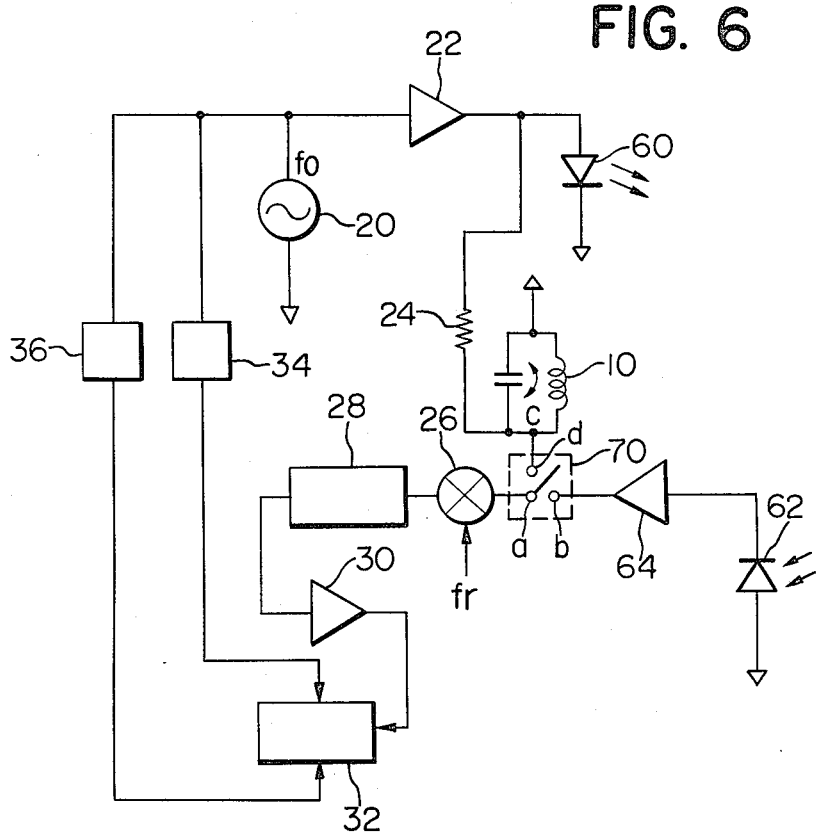
FIG. 6 shows another embodiment of the present invention as utilized in combination with another apparatus.

The displacement measuring apparatus of the present invention can be most conveniently employed in a digital tachimeter composed of a combination of an optical range-finding apparatus and a digital theodolite, as various components can be utilized in common in both apparatus, as shown as a fourth embodiment in FIG. 6.

The circuit shown in FIG. 6 functions either as a range-finding apparatus or a displacement measuring apparatus, respectively, when the terminals a and b or terminals a and d are connected in a switch 70. In an optical range-finding apparatus, as already known, a signal of a frequency $f_O$ from an oscillator 20 is supplied through a buffer amplifier 22 to a light-emitting diode 60 to modulate the light therefrom, and the reflected light from a target is received by a photodiode 62 the output signal of which is amplified in an amplifier 64 and is subjected to a frequency conversion in a mixer 26 by multiplication with a signal of a frequency $f_r$. Then a bandpass filter 28 selects a signal of a frequency $f_o-f_r$ which is amplified in an amplifier 30 and supplied to a phase meter which also receives a standard signal of a frequency $f_o-f_r$ from a frequency dividing circuit 36 and counts the clock pulses, supplied from a wave forming circuit 34, of a number corresponding to the phase difference between the signal from the amplifier 30 and the standard signal, the number of clock pulses being subsequently converted into a distance. As explained above, the components represented by the same numbers as in FIG. 1 perform functions identical to those shown in FIG. 1. It is therefore possible to measure the phase difference corresponding to the capacity C when the switch 70 is positioned to connect the terminals a and d.

As explained in detail in the foregoing, the present invention allowing the measurement of displacement of electrodes by shifting the phase of an AC signal in an amount corresponding to the electrostatic capacity between mutually facing electrodes and by determining the amount of the phase shift, is substantially free from influence of external perturbations such as temperature change or noises and therefore provides a displacement measuring apparatus of an improved accuracy.

I believe that the construction and operation of my novel apparatus for measuring displacement will now be understood and that the advantages thereof will be fully appreciated by those persons skilled in the art.

I claim:

1. Apparatus for measuring the amount of relative displacement between elements comprising:
   fixed electrode means;
   movable electrode means displaceable with respect to said fixed electrode means, said fixed electrode means and said movable electrode means being in mutually facing disposition;
   a power source for generating an AC signal of a determined frequency;
   phase-shifting means comprising a resistor and said mutually facing electrodes, said phase-shifting means being adapted to apply said AC signal to said mutually facing electrode means through said resistor and to generate an output signal the phase of which is shifted in response to the amount of relative displacement of said mutually facing electrode means; and
   phase difference measuring means for measuring the phase difference between said output signal of said phase-shifting means and said AC signal and generating a signal corresponding to the amount of relative displacement of said mutually facing electrode means;
   said fixed electrode comprising a first electrode and a second electrode which are provided in such positions that the distances therefrom to said movable electrode change in opposite directions.

2. A displacement measuring apparatus according to claim 1 wherein said phase difference measuring means comprise:
   a first memory circuit for memorizing a first signal corresponding to a phase difference between said AC signal and the output signal of said phase shifting means obtained when said switching means is in a first state;
   a second memory circuit for memorizing a second signal corresponding to a phase difference between said AC signal and the output signal of said phase shifting means obtained when said switching means is in a second state; and
   a subtracting circuit for subtracting said second signal from said first signal to obtain an output signal corresponding to the amount of relative displacement of said mutually facing electrodes.

3. A displacement measuring apparatus according to claim 1, wherein said phase-shifting means comprises a coil constituting a resonance circuit with said mutually facing electrodes.

4. A displacement measuring apparatus according to claim 3 wherein said phase-shifting means further comprises a capacitor which is connected parallel to said coil and functions as an auxiliary capacitor in said resonance circuit.

5. A displacement measuring apparatus according to claim 1 wherein said phase-shifting means further comprises a capacitor of a variable capacity connected parallel to said first electrode for balancing the capacities of said first and second electrodes.

6. Apparatus for measuring the amount of relative displacement between elements comprising:
   fixed electrode means;
   movable electrode means displaceable with respect to said fixed electrode means, said fixed electrode means and said movable electrode means being in mutually facing disposition;
   a power source for generating an AC signal of a determined frequency;
   phase-shifting means comprising a resistor and said mutually facing electrodes, said phase-shifting means being adapted to apply said AC signal to said mutually facing electrode means through said resistor and to generate an output signal the phase of which is shifted in response to the amount of relative displacement of said mutually facing electrode means; and
   phase difference measuring means for measuring the phase difference between said output signal of said phase-shifting means and said AC signal and generating a signal corresponding to the amount of relative displacement of said mutually facing electrode means;
   said fixed electrode being composed of a pair of electrodes which are provided in such positions that the distances therefrom to said movable electrode change in the same direction, and said AC signal is applied between said paired electrodes.

7. An optical range-measuring apparatus comprising in combination:
   a light source for directing a light beam toward a reflective object;
   a power source for generating an AC signal of a determined frequency;
   modulating means for modulating said light beam from said light source with said AC signal;
   a photoelectrical converter for photoelectrically converting the reflected light beam received from said reflective object;
   phase-shifting means including a fixed electrode provided integrally with said apparatus, a movable electrode maintained in facing relationship to said fixed electrode and in a constant direction with respect to the absolute horizontal plane irrespective of eventual inclination of said apparatus and a resistor connected at one end to said power source and at its other end to one of said electrodes, whereby said AC signal is applied to said mutually facing electrodes through said resistor, so that said phase-shifting means generates an output signal the phase of which is shifted in response to the amount of relative displacement of said mutually facing electrodes;
   phase difference measuring means for measuring a phase difference selectively between the photoelectrically converted signal from said photoelectrical converter and the AC signal from said power source for measuring the distance to said reflective object by means of the phase difference obtained in said phase difference measuring means or between said output signal of said phase-shifting means and the AC signal from said power source for measuring relative displacement of said mutually facing electrodes; and
   switching means for selectively applying the output of said phase-shifting means or the output of said photoelectrical converter to said phase difference measuring means.

\* \* \* \* \*